United States Patent
Chen

(10) Patent No.: US 9,807,696 B2
(45) Date of Patent: Oct. 31, 2017

(54) METHOD AND DEVICE FOR CONTROLLING UPLINK POWER

(71) Applicant: Sanechips Technology Co., Ltd., Shenzhen, Guangdong (CN)

(72) Inventor: Yunsheng Chen, Shenzhen (CN)

(73) Assignee: SANECHIPS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 15/123,723

(22) PCT Filed: May 20, 2014

(86) PCT No.: PCT/CN2014/077936
§ 371 (c)(1),
(2) Date: Sep. 6, 2016

(87) PCT Pub. No.: WO2015/131447
PCT Pub. Date: Sep. 11, 2015

(65) Prior Publication Data
US 2017/0034787 A1 Feb. 2, 2017

(30) Foreign Application Priority Data
Mar. 6, 2014 (CN) .......................... 2014 1 0082066

(51) Int. Cl.
*H04W 52/14* (2009.01)
*H04W 52/34* (2009.01)
(Continued)

(52) U.S. Cl.
CPC ......... *H04W 52/146* (2013.01); *H04W 52/24* (2013.01); *H04W 52/346* (2013.01); *H04W 52/367* (2013.01)

(58) Field of Classification Search
CPC ............. H04W 52/146; H04W 52/346; H04W 52/367; H04W 24/00; H04W 88/08;
(Continued)

(56) References Cited

U.S. PATENT DOCUMENTS 6,577,875 B1 * 6/2003 Brouwer ............. H04W 52/146
370/317
7,483,404 B2 * 1/2009 Zhang ................... H04W 52/08
370/317
(Continued)

FOREIGN PATENT DOCUMENTS

CN        1681221 A     10/2005
CN        1744453 A     3/2006
(Continued)

OTHER PUBLICATIONS

International Search Report in international application No. PCT/CN2014/077936, dated Dec. 22, 2014, 5 pgs.
(Continued)

*Primary Examiner* — Keith Ferguson
(74) *Attorney, Agent, or Firm* — Cooper Legal Group, LLC

(57) ABSTRACT

Provided is a method for controlling uplink power, which includes that: a Node B makes statistics on a transmit Total Power (TP) value of all users in a cell, compares the obtained transmit TP value with a received TP threshold value of the cell, and when it is determined that the transmit TP value is smaller than the received TP threshold value of the cell and a difference between the transmit TP value and the received TP threshold value is smaller than an abundance threshold, allows a user satisfying an intervention strategy of the cell to increase power. A device for controlling uplink power is also provided.

11 Claims, 3 Drawing Sheets

---

201. A Node B makes statistics on a transmit TP value of all users in a cell

202. The Node B compares the obtained transmit TP value with a received TP threshold value of the cell, and when it is determined that the transmit TP value is smaller than the received TP threshold value of the cell and a difference between the transmit TP value and the received TP threshold value is smaller than an abundance threshold, allows a user satisfying an intervention strategy of the cell to increase power

(51) Int. Cl.
*H04W 52/36* (2009.01)
*H04W 52/24* (2009.01)

(58) Field of Classification Search
CPC ... H04W 24/06; H04W 52/283; H04W 52/34; H04W 52/143; H04W 72/121
USPC ........ 455/522, 68, 69, 500, 517, 67.11, 509, 455/450, 453, 127.1–127.3, 422.1, 403, 455/550.1, 423–425, 426.1, 426.2, 507, 455/515; 370/310, 317, 318, 313, 252
See application file for complete search history.

(56) References Cited

U.S. PATENT DOCUMENTS

| | | | |
|---|---|---|---|
| 8,068,869 B2 | 11/2011 | Catreux-Erceg | |
| 2003/0045317 A1* | 3/2003 | Pan | H04W 4/10 455/518 |
| 2009/0093219 A1 | 4/2009 | Katada | |
| 2013/0190035 A1 | 7/2013 | Wang | |

FOREIGN PATENT DOCUMENTS

| | | |
|---|---|---|
| CN | 1822520 A | 8/2006 |
| CN | 102056278 A | 5/2011 |
| CN | 102404836 A | 4/2012 |
| EP | 1751881 A1 | 2/2007 |
| EP | 2015475 A1 | 1/2009 |
| EP | 2429245 A1 | 3/2012 |
| WO | 0201733 A2 | 1/2002 |
| WO | 0201733 A3 | 3/2002 |
| WO | 02056505 A1 | 7/2002 |
| WO | 2005109673 A1 | 11/2005 |

OTHER PUBLICATIONS

English Translation of the Written Opinion of the International Search Authority in international application No. PCT/CN2014/077936, dated Dec. 22, 2014, 14 pgs.

Supplementary European Search Report in European application No. 14884654.6, dated Feb. 8, 2017, 6 pgs.

3GPP TS 25.214 V7.9.0 Technical Specification Group Radio Access Network;Physical layer procedures (FDD) (Release 7) Jun. 18, 2006, reprinted from the Internet at: https://portal.3gpp.org/desktopmodules/Specifications/SpecificationDetails.aspx?specificationId=470, Versions, Release 7, RAN #40, 86 pgs.

* cited by examiner

METHOD AND DEVICE FOR CONTROLLING UPLINK POWER

TECHNICAL FIELD

The present disclosure relates to a symbol-level power control technology for an uplink Dedicated Physical Control Channel (DPCCH), and in particular to a method and device for controlling uplink power.

BACKGROUND

3rd-Generation (3G) mobile communication is to enable a user to have smooth communication under various conditions, and is to support communication from voice to packet data and from images to multimedia services, which needs a higher data rate, a greater data bandwidth, a higher spectrum utilization rate, higher quality of service and lower power consumption and system cost. Wideband Code Division Multiple Access (WCDMA) is one of mainstream 3G standards, and power control, as one of key WCDMA technologies, is important technical means for solving the problems of near-far effect and self-interference and improving communication quality.

In existing WCDMA, there exists a symbol-level processing method for an uplink DPCCH in a final receiver (RAKE receiver) capable of separating multipath signals and effectively combining energy of the multipath signals. As shown in FIG. 1, the method mainly includes channel estimation, control channel compensation and Maximum Ratio Combining (MRC), Signal to Interference Ratio (SIR) estimation, frequency offset estimation, Transport Format Combination Indicator (TFCI) decoding, DPCCH symbol detection, closed loop diversity, and uplink and downlink power control. The power control has two directions, i.e., uplink and downlink, in the RAKE receiver, wherein uplink power control refers to that a Node B performs channel detection and quality assessment and controls power on the user side to increase and decrease; and the downlink power control refers to that the Node B determines and calculates the increase and decrease of power on the Node B side according to a Transmit Power Command (TPC) symbol, sent by the user, in the DPCCH. When a communication environment is good and signal attenuation and interference are low, transmit power of the user may be decreased by power control while guaranteeing communication quality, thereby reducing interference between users, increasing system capacity and reducing system power consumption; while when the communication environment is poor, the transmit power of the user is increased to enhance strength of a signal and guarantee a good SIR of the signal in the poor environment, thereby guaranteeing communication reliability and quality.

Because of the problems of near-far effect and self interference, the increase of transmit power of a single user may cause influence on quality of service of other users, and then power control has two conflicts in a WCDMA system: increasing the transmit power may improve quality of service and performance of the user on one aspect, and on the other aspect, increasing the transmit power may also increase interference to other users to cause reduction in quality of service and performance of other users.

SUMMARY

In order to solve the existing technical problem, the embodiments of the present disclosure provide a method and device for controlling uplink power.

The technical solutions of the embodiments of the present disclosure are implemented as follows.

An embodiment of the present disclosure provides a method for controlling uplink power, which may include that:

a Node B makes statistics on a transmit Total Power (TP) value of all users in a cell, compares the obtained transmit TP value with a received TP threshold value of the cell, and when it is determined that the transmit TP value is smaller than the received TP threshold value of the cell and a difference between the transmit TP value and the received TP threshold value is smaller than an abundance threshold, allows a user satisfying an intervention strategy of the cell to increase power.

An embodiment of the present disclosure further provides a device for controlling uplink power, which may include: a measurement unit, a process control unit, a comparison unit and a selection unit, wherein the measurement unit may be configured to make statistics on a transmit TP value of all users in a cell, compare the obtained transmit TP value with a received TP threshold value of the cell, and send a comparison result to the selection unit;

the selection unit may be configured to, when the comparison result indicates that the transmit TP value is smaller than the received TP threshold value of the cell and a difference between the transmit TP value and the received TP threshold value is smaller than an abundance threshold, select to start an intervention strategy of the cell, and send a selection result to the process control unit; and the process control unit may be configured to, when the selection result is selecting to start the intervention strategy of the cell, allow a user satisfying the intervention strategy of the cell to increase power.

According to the method and device for controlling uplink power provided by the embodiments of the present disclosure, a Node B makes statistics on a transmit TP value of all the users in a cell, compares the obtained transmit TP value with a received TP threshold value of the cell, and when it is determined that the transmit TP value is smaller than the received TP threshold value of the cell and a difference between the transmit TP value and the received TP threshold value is smaller than an abundance threshold, allows a user satisfying an intervention strategy of the cell to increase power; and therefore, according to the present disclosure, normal power increase of users in an environment with high communication quality can be guaranteed, power of the users may also be selectively increased according to need in an environment with poor communication quality, and power increase of the users is controlled to reduce interference among the users, improve performance and capacity of the whole system and reduce system instability and frequent call drop caused by power fluctuation of the users.

Figure 1:
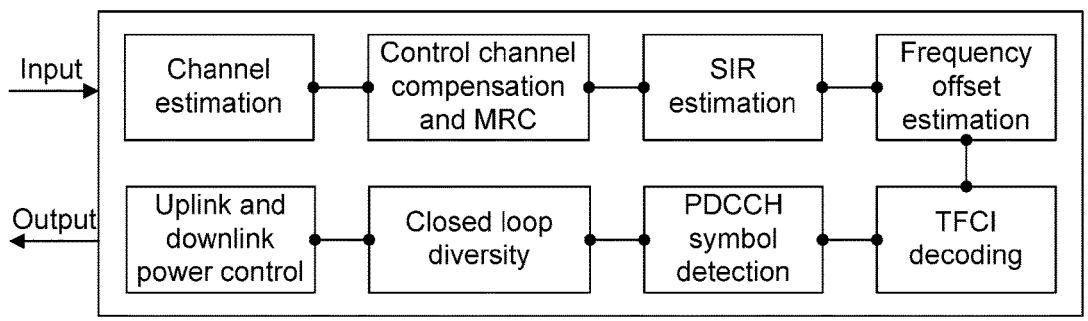
FIG. 1 is a flowchart of a processing method for an uplink dedicated control channel in existing technologies.

In the drawings: 1, measurement unit; 2, process control unit; 3, comparison unit; and 4, selection unit.

DETAILED DESCRIPTION

In the embodiments of the present disclosure, a Node B makes statistics on a transmit TP value of all users in a cell, compares the obtained transmit TP value with a received TP threshold value of the cell, and allows a user satisfying an intervention strategy of the cell to increase power when it is determined that the transmit TP value is smaller than the received TP threshold value of the cell and a difference between the transmit TP value and the received TP threshold value is smaller than an abundance threshold.

The present disclosure will be further described below with reference to the drawings and specific embodiments in detail.

Embodiment 1

Figure 2:
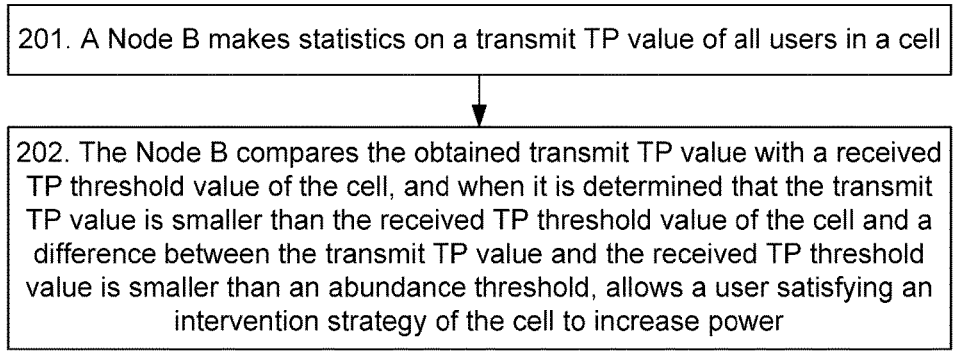
FIG. 2 is a flowchart of a method for controlling uplink power according to embodiment 1 of the present disclosure.

The embodiment of the present disclosure implements a method for controlling uplink power. As shown in FIG. 2, the method is specifically implemented by the following steps.

Step 201: a Node B makes statistics on a transmit TP value of all users in a cell.

Here, the Node B adds transmit power values of all the users in the cell to obtain the transmit TP value of all the users in the cell.

Step 202: the Node B compares the obtained transmit TP value with a received TP threshold value of the cell; when it is determined that the transmit TP value is smaller than the received TP threshold value of the cell and a difference between the transmit TP value and the received TP threshold value is smaller than an abundance threshold, the Node B allows a user satisfying an intervention strategy of the cell to increase power.

Here, the Node B is provided with a Maximum Power Target (MTP) of TP, and configures the received TP threshold value of each cell according to the MTP.

The Node B compares the obtained transmit TP value of all the users in the cell with the received TP threshold value of the cell; when it is determined that the transmit TP value is smaller than the received TP threshold value of the cell and the difference between the transmit TP value and the received TP threshold value is greater than or equal to the abundance threshold, it is indicated that power of the cell is abundant, the intervention strategy of the cell is not needed to be started for the users, and the Node B allows all the users in the cell to increase power according to need; while when the transmit TP value is smaller than the received TP threshold value of the cell and the difference between the transmit TP value and the received TP threshold value is smaller than the abundance threshold, it is indicated that the power of the cell is not abundant and interference among the users is strong, the intervention strategy of the cell is enabled for the users, power is reasonably allocated to each user in the cell, and the user satisfying the intervention strategy of the cell is allowed to increase power according to the intervention strategy of the cell; and when the transmit TP value is greater than or equal to the received TP threshold value of the cell, the intervention strategy of the cell is enabled for the users, and transmit power values are regulated according to priority of the users.

The abundance threshold set by the Node B is related to a communication environment of the cell; if the communication environment is poorer, the abundance threshold is needed to be greater, and sufficient redundancy is needed to be reserved because the user needs to increase power for many times so as to implement effective communication; and if the communication environment is good, a smaller abundance threshold may be reserved.

The Node B may also set exception permissions for the users and mark whether the users have exception permissions or not. Before step 201, the Node B reads permission marks of all the users, and if a user has a permission mark, it is indicated that the user has an exception permission, and power increase is directly performed according to need of the user; if a user has no permission mark, it is indicated that the user has no exception permission, and power control is performed on the user according to steps 201~202. For example, a permission mark of a user with an exception permission is represented by 1, and a permission mark of a user without an exception permission is represented by 0.

Embodiment 2

Figure 3:
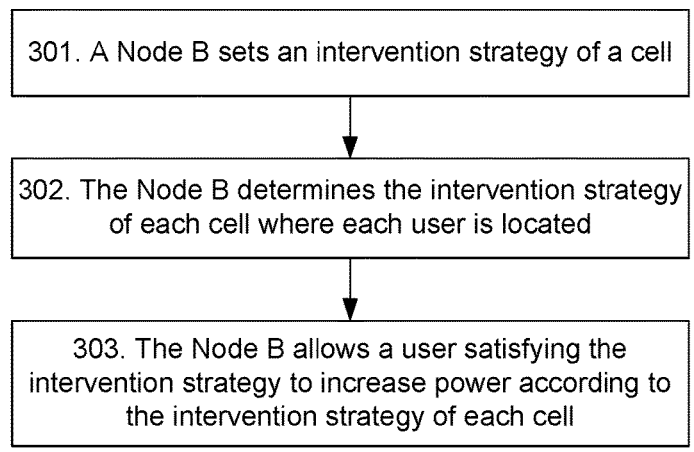
FIG. 3 is a flowchart of a method for controlling uplink power according to embodiment 2 of the present disclosure.

The step that the Node B allows the user satisfying the intervention strategy of the cell to increase power, as shown in FIG. 3, is specifically implemented by the following steps.

Step 301: the Node B sets an intervention strategy of a cell.

Here, the intervention strategy adopts a normal mode or a restricted mode;

the intervention strategy adopting the normal mode is that: when it is determined that a link of a user needs to increase power, the link is allowed to increase power;

the intervention strategy adopting the restricted mode is that: when it is determined that a link of a user needs to increase power, if a difference between power increase times and power decrease times in historical data of the link does not exceed an increase and decrease threshold, then the link is allowed to increase power, otherwise the link is forbidden to increase power; or when it is determined that the link of the user needs to increase power and a transmit TP value of all users in a cell is greater than a received TP threshold value of the cell, users with high priority are allowed to increase power, while users with low priority are forced to decrease power according to priority levels.

The Node B sets respective intervention strategies for cells, and each cell adopts the same intervention strategy for all links within its range.

Step 302: the Node B determines the intervention strategy of each cell where each user is respectively located.

Here, each link of each user is bound with a cell Identifier (id) of each cell where the each link is respectively located, the each cell where each link is respectively located sends the cell id of the each cell to users, then a user with multiple links may have cell ids of multiple cells. Since the cell id of each cell has a corresponding cell mode, intervention strategies of the cells are determined according to values of the cell modes, and intervention strategies which may be adopted for the users are finally determined. When link conditions of each user change, each link is needed to re-determine the cell id of each cell where the each link is respectively located, the intervention strategy of the each cell is determined according to the value of the cell mode corresponding to the cell id, and furthermore, the intervention strategy of each cell where each user is respectively located after changing is re-determined.

Step 303: the Node B allows a user satisfying the intervention strategy to increase power according to the intervention strategy of the each cell.

Here, when a transmit TP value of all users in a cell is smaller than a received TP threshold value and a difference between the transmit TP value and the received TP threshold value is smaller than an abundance threshold, under the condition that a user has a single link, the Node B allows the user to increase power when an intervention strategy of the cell adopts the normal mode and when it is determined that the user needs to increase power in a current slot; when the intervention strategy of the cell adopts the restricted mode and it is determined that the user needs to increase power in the current slot, historical data of power increase and decrease of the single link is read, and if a difference between power increase times and power decrease times in the historical data does not exceed an increase and decrease threshold, then the user satisfies the intervention strategy of the cell, and the user is allowed to increase power, otherwise the user is not allowed to increase power. The increase and decrease threshold is set according to redundancy of power of the cell and a power demand condition of the user. The priority of the user is also needed to be taken into consideration. If the redundancy of the power of the cell is low and the user has a high demand on power increase, a strict restriction may be set for a user with low priority when power supply is not sufficient.

Or, under the condition that a user has multiple links and the multiple links are not located in the same cell, when the multiple links all satisfy intervention strategies of cells where the multiple links are located, the user is allowed to increase power; the condition that the multiple link satisfy the intervention strategies of the cells where they are located refers to that: when the intervention strategies of the cells where the multiple links are located adopt the normal mode and it is determined that the multiple links need power increase in a current slot, the multiple links automatically satisfy the intervention strategies of the cells; and when the intervention strategies of the cells where the multiple links are located adopt the restricted mode and it is determined that the links need power increase in the current slot, historical data of power increase and decrease of the links is read, and if each difference between power increase times and power decrease times in the historical data does not exceed an increase and decrease threshold, then the links satisfy the intervention strategies of the cells.

The Node B stores historical data of power increase and decrease after power control over the users is performed.

Embodiment 3

Figure 4:
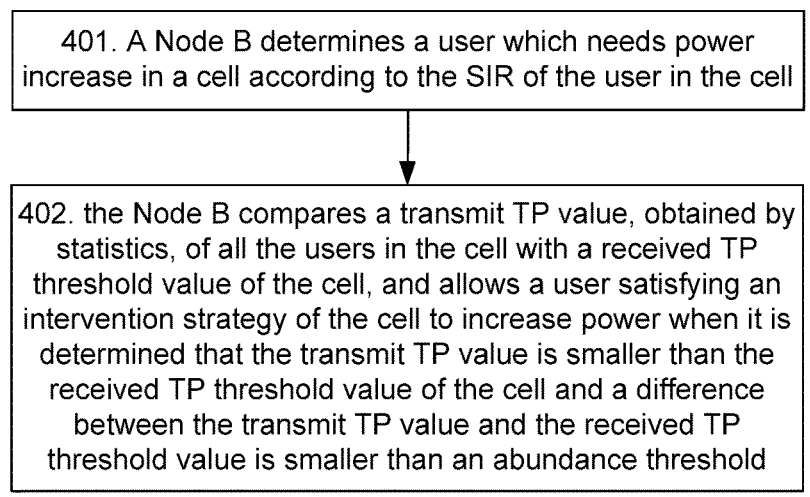
FIG. 4 is a flowchart of a method for controlling uplink power according to embodiment 3 of the present disclosure.

The embodiment of the present disclosure implements a method for controlling uplink power. As shown in FIG. 4, the method is specifically implemented by the following steps.

Step 401: a Node B determines a user which needs power increase in a cell according to the SIR of the user in the cell.

Here, the Node B estimates the SIR of each user in the cell, compares the obtained SIR of each user with an SIR threshold value (SIR_target), and determines that a user satisfying SIR<SIR_target is needed to increase power while a user satisfying SIR≥SIR_target is needed to appropriately decrease power according to a comparison result. The Node B determines a value of a TPC of a user needing to increase power according to the comparison result, and the Node B determines the value of the TPC in a manner specified in a 3rd Generation Partnership Project (3GPP) specification TS 25.214. When SIR≥SIR_target, it is indicated that the user has high channel quality, and may appropriately decrease the power; while when SIR<SIR_target, it is indicated that the user has poor channel quality, and is needed to increase power. The SIR_target is an SIR reference value obtained by measuring a signal, and is set by a high layer of the Node B.

Step 402: the Node B compares a transmit TP value, obtained by statistics, of all the users in the cell with a received TP threshold value of the cell, and allows a user satisfying an intervention strategy of the cell to increase power when it is determined that the transmit TP value is smaller than the received TP threshold value of the cell and a difference between the transmit TP value and the received TP threshold value is smaller than an abundance threshold.

Here, the Node B makes statistics on transmit power values of all the users in the cell, and adds the transmit power value of each user to obtain the transmit TP value of all the users in the cell.

The Node B sets MTP of TP, and sets the received TP threshold value of each cell according to the MTP.

The Node B compares the obtained transmit TP value of all the users in the cell with the received TP threshold value of the cell, and when it is determined that the transmit TP value is smaller than the received TP threshold value of the cell and the difference between the transmit TP value and the received TP threshold value is greater than or equal to the abundance threshold, it is indicated that power of the cell is abundant, the intervention strategy of the cell is not needed to be started for the users, and the Node B allows all the users in the cell to increase power according to need; while when the transmit TP value is smaller than the received TP threshold value of the cell and the difference between the transmit TP value and the received TP threshold value is smaller than the abundance threshold, it is indicated that the power of the cell is not abundant, the intervention strategy of the cell is enabled for the users, and the user satisfying the intervention strategy of the cell is allowed to increase power according to the intervention strategy of the cell; and when the transmit TP value is greater than or equal to the received TP threshold value, it is indicated that the power of the cell is not abundant, users with high priority are allowed to increase power, while users with low priority are forced to decrease power.

The abundance threshold set by the Node B is related to a communication environment of the cell. If the communication environment is poorer, the abundance threshold is needed to be greater, and sufficient redundancy is needed to be reserved because the user needs to increase power for many times to implement effective communication. If the communication environment is good, a smaller abundance threshold may be reserved.

The Node B may also set exception permissions for users and mark whether the users have exception permissions or not, and then, before step 401, the Node B reads permission marks of the users; if a user has a permission mark, it is indicated that the user has an exception permission, and power increase is directly performed according to need of the user; if a user has no permission mark, it is indicated that the user has no exception permission, and power control is performed on the user according to steps 401~402. A permission mark of a user with an exception permission may be 1, and a permission mark of a user without an exception permission may be 0.

Embodiment 4

Figure 5:
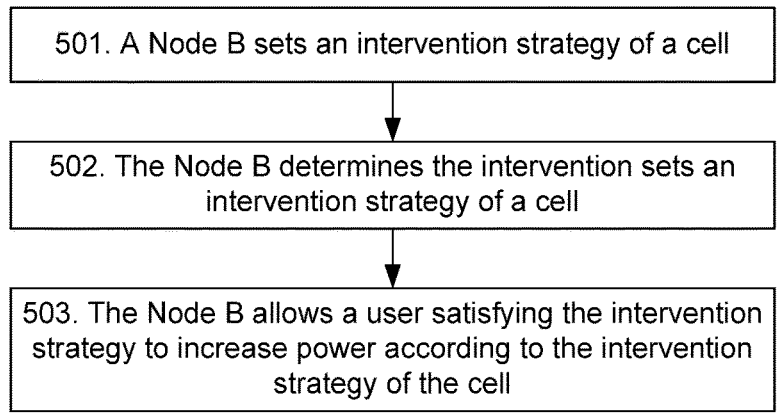
FIG. 5 is a flowchart of a method for controlling uplink power according to embodiment 4 of the present disclosure.

The step that the Node B allows the user satisfying the intervention strategy of the cell to increase power, as shown in FIG. 5, is specifically implemented by the following steps.

Step 501: the Node B sets an intervention strategy of a cell.

Here, the intervention strategy adopts a normal mode or a restricted mode;

the intervention strategy adopting the normal mode is that: when it is determined that a link of a user needs to increase power, the link is allowed to increase power;

the intervention strategy adopting the restricted mode is that: when it is determined that a link of a user needs to increase power, if a difference between power increase times and power decrease times in historical data of the link does not exceed an increase and decrease threshold, then the link is allowed to increase power, otherwise the link is forbidden to increase power; or when it is determined that the link of the user needs to increase power and a transmit TP value of all users in a cell is greater than a received TP threshold value of the cell, users with high priority are allowed to increase power while users with low priority are forced to decrease power according to priority levels.

The normal mode and restricted mode of the intervention strategy both correspond to values of cell modes. When a cell determines the type of an intervention strategy, a value of a cell mode corresponding to the type is stored in a Random Access Memory (RAM).

The Node B sets an intervention strategy for each cell, respectively, and each cell adopts the same intervention strategy for all links within its range.

Step 502: the Node B determines the intervention strategy of a cell where each user is respectively located.

Here, since a user may have multiple links, each link of the user is bound with a cell id of each cell where the each link is located, the each cell where each link is located sends the cell id of the each cell to the user, then the user with multiple links may have cell ids of multiple cells. Since the cell id of each cell has a corresponding cell mode, intervention strategies of the cells are determined according to values of the cell modes, and intervention strategies which may be adopted for the users are finally determined. Moreover, when link conditions of each user change, each link is needed to re-determine the cell id of each cell where the each link is respectively located, the intervention strategy of the each cell is determined according to the value of cell mode corresponding to the cell id, and furthermore, the intervention strategy of the cell where the user is located after changing is re-determined. For example, if an intervention strategy of a cell adopts the normal mode, a value of a corresponding cell mode is 0, while if the intervention of the cell adopts the restricted mode, the value of the corresponding cell mode is 1.

For example, in a WCDMA system, user A has two links, and the two links of user A are a first link and a second link respectively, wherein a cell where the first link is located is a first cell, a cell where the second link is located is a second cell, the first cell and the second cell transmit their own cell ids to user A respectively, and then user A is bound with the cell id of the first cell and the cell id of the second cell respectively;

when a link condition of user A changes, the two links are changed into three links, a cell where a third link is located is a third cell, the third cell transmits its cell id to user A, and then user A is bound with the cell id of the first cell, the cell id of the second cell and the cell id of the third cell respectively;

when user A has two links, i.e. a first link and a second link respectively, a cell where the first link is located is a first cell, a cell where the second link is located is a third cell, a second cell and the third cell transmit their own cell ids to user A respectively during handover of the first link from the first cell to the second cell, and then user A is bound with the cell ids of the second cell and the third cell; and the Node B stores the cell ids bound with the user in the RAM.

Step 503: the Node B allows a user satisfying the intervention strategy to increase power according to the intervention strategy of the cell.

Here, when a transmit TP value is smaller than a received TP threshold value and a difference between the transmit TP value and the received TP threshold value is smaller than an abundance threshold, under the condition that a user has a single link, the Node B allows the user to increase power when an intervention strategy of a cell adopts the normal mode and when it is determined that the user needs to increase power in a current slot; when the intervention strategy of the cell adopts the restricted mode and it is determined that the user needs to increase power in the current slot, historical data of power increase and decrease of the single link is read, and if a difference between power increase times and power decrease times in the historical data does not exceed an increase and decrease threshold, then the user is determined to satisfy the intervention strategy of the cell, and is allowed to increase power. The increase and decrease threshold is set according to redundancy of power of the cell and a power demand condition of the user, and priority of the user is also needed to be taken into consideration. If the redundancy of the power of the cell is low and the user has a high demand on power increase, a strict restriction may be set for a user with low priority under the condition of short power supply.

Or, under the condition that a user has multiple links and the multiple links are not located in the same cell, when the multiple links all satisfy intervention strategies of cells where they are located, the user is allowed to increase power; the condition that the multiple links satisfy the intervention strategies of the cells where they are located refers to that: when the intervention strategies of the cells where the links are located adopt the normal mode and it is determined that the links need power increase in a current slot, the links automatically satisfy the intervention strategies of the cells; and when the intervention strategies of the cells where the cells are located adopt the restricted mode and it is determined that the links need power increase in the current slot, historical data of power increase and decrease of the links is read, and if each difference between power increase times and power decrease times in the historical data does not exceed an increase and decrease threshold, the links are determined to satisfy the intervention strategies of the cells.

Figure 6:
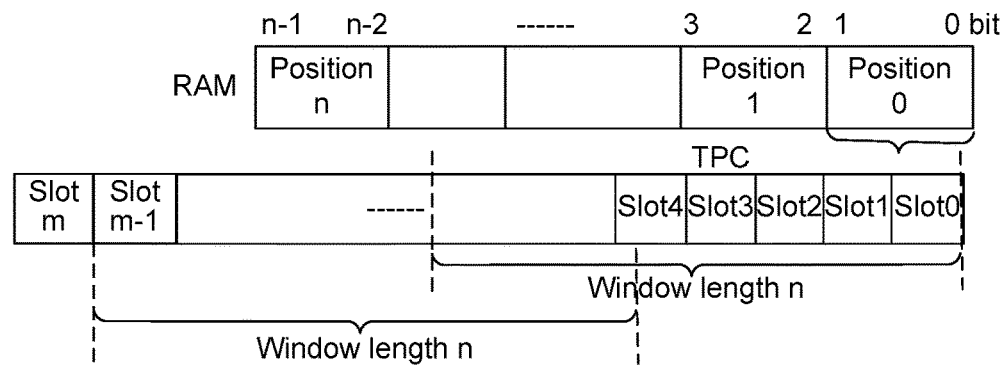
FIG. 6 is a schematic diagram illustrating access to historical TPC values by a sliding window in a method for controlling uplink power according to an embodiment of the present disclosure.

The Node B stores historical data of power increase and decrease after power control over the users is performed. For example, as shown in FIG. 6, when historical TPC values are stored in the RAM, a sliding window is adopted for storage of the historical TPC values, which only stores a historical TPC value corresponding to the latest slot with a total length n. The Node B stores the historical TPC value into a storage position, corresponding to the window, of the RAM after increasing and decreasing power of the user in a certain slot, the storage position being position 0, position 1 to position m, and the slot being slot0, slot1, slot2, slot3, slot4 to slot m−1 and slot m. When historical TPC values are queried, historical TPC values stored at corresponding storage positions of the RAM within a window length range are read, then the read historical TPC values are accumulated and determined according to a principle that +1 indicates power increase and −1 indicates power decrease. If an accumulation result is power decrease or smaller than a power increase threshold restriction, then power increase is allowed when a TPC value in a current slot indicates that power increase is needed, otherwise power increase is restricted. After processing, the window slides forwards, a previously stored TPC value is deleted, and the TPC value in the current slot is stored for judgment in the next slot.

Embodiment 5

Figure 7:
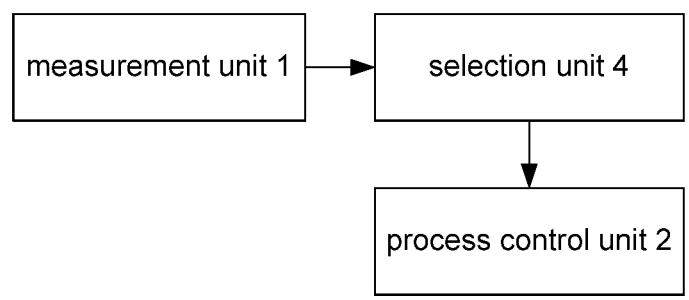
FIG. 7 is a structure diagram of a device for controlling uplink power according to embodiment 5 of the present disclosure.

The embodiment of the present disclosure implements a device for controlling uplink power. As shown in FIG. 7, the device includes a measurement unit 1, a process control unit 2 and a selection unit 4, wherein the measurement unit 1 makes statistics on a transmit TP value of all users in a cell, obtains a comparison result according to a comparison between the obtained transmit TP value and a received TP threshold value of the cell where the users are located, and sends the obtained comparison result to the selection unit 4;

the measurement unit 1 adds transmit power values of all the users in the cell to obtain the transmit TP value of all the users in the cell; and the measurement unit 1 sets received TP threshold values of each cell according to MTP of TP, compares the obtained transmit TP value of all the users in the cell with the received TP threshold value of the cell, and sends the comparison result to the selection unit 4.

The selection unit 4 is configured to, when the comparison result indicates that the transmit TP value is smaller than the received TP threshold value of the cell and a difference between the transmit TP value and the received TP threshold value is smaller than an abundance threshold, select to start an intervention strategy of the cell, and send a selection result to the process control unit 2;

the process control unit 2 sets the abundance threshold, wherein the abundance threshold is related to a communication environment of the cell; the poorer the communication environment is, the greater the abundance threshold is needed, and sufficient redundancy is needed to be reserved because the user may implement effective communication only after power is increased for many times. If the communication environment is good, a smaller abundance threshold may be reserved.

The selection unit 4 is configured to, when the comparison result indicates that the transmit TP value is smaller than the received TP threshold value and the difference between the transmit TP value and the received TP threshold value is greater than or equal to the abundance threshold, determine that power of the cell is abundant and select not to start the intervention strategy for the users; while when the comparison result indicates that the transmit TP value is smaller than the received TP threshold value and the difference between the transmit TP value and the received TP threshold value is smaller than the abundance threshold, determine that the power of the cell is sufficient but not abundant and select to start the intervention strategy of the cell for the users; and the selection unit 4 sends a selection result to the process control unit 2.

The selection unit 4 is further configured to, when the transmit TP value of all the users in the cell is greater than or equal to the received TP threshold value of the cell, start the intervention strategy of the cell for the users, and regulate the transmit power values of the users according to priority.

The process control unit 2 may allocate power to all the users according to need when the selection result is selecting not to start the intervention strategy of the cell, and allows a user satisfying the intervention strategy of the cell to increase power according to the intervention strategy of the cell when the selection result is selecting to start the intervention strategy of the cell;

the process control unit 2 is further configured to set exception permissions for the users and mark whether the users have exception permissions or not, and is further configured to read permission marks of the users; if a user has a permission mark, determine that the user has an exception permission and directly perform power increase according to need of the user, while if a user has no permission mark, determine that the user has no exception permission and send a message to the measurement unit 1. For example, a permission mark of a user with an exception permission is 1, and a permission mark of a user without any exception permission is 0.

The measurement unit 1 may be a measurement receiver, the process control unit 2 may be a base station controller, and the selection unit 4 may be a selector.

The process control unit 2 of the device may further be configured to allow the user satisfying the intervention strategy of the cell to increase power;

the process control unit 2 sets an intervention strategy of each cell, wherein the intervention strategy adopts a normal mode or a restricted mode;

the intervention strategy adopting the normal mode is that: when it is determined that a link of a user needs to increase power, the link is allowed to increase power;

the intervention strategy adopting the restricted mode is that: when it is determined that a link of a user needs to increase power, if a difference between power increase times and power decrease times in historical data of the link does not exceed an increase and decrease threshold, then the link is allowed to increase power; and the process control unit 2 sets an intervention strategy for each cell, respectively, and each cell adopts the same intervention strategy for all links within its range.

The process control unit 2 is configured to determine the intervention strategies of cells where the users are located.

Here, since a user may have multiple links, each link of the user is bound with a cell id of a cell where the each link is respectively located, the cell where each link is respectively located sends the cell id of the cell to the user, then a user with multiple links may have cell ids of multiple cells. Since the cell id of each cell has a corresponding cell mode, the intervention strategy of each cell determined according to a value of a cell mode, and the intervention strategy which may be adopted for the user is finally determined. When link conditions of each user change, each link is needed to re-determine the cell id of the cell where the each link is respectively located, the intervention strategy of the cell is determined according to a value of a cell mode corresponding to the cell id, and the intervention strategy of the cell where the user is located after changing is re-determined.

The process control unit 2 is configured to allow the user satisfying the intervention strategy to increase power according to the intervention strategy of the cell, wherein, when the transmit TP value of all the users in the cell is smaller than the received TP threshold value of the cell and the difference between the transmit TP value and the received TP threshold value is smaller than the abundance threshold, under the condition that the user has a single link, the process control unit 2 allows the user to increase power when the intervention strategy of the cell adopts the normal mode and when it is determined that the user needs to increase power; when the intervention strategy of the cell adopts the restricted mode and it is determined that the user needs to increase power, historical data of power increase and decrease of the single link is read, and if a difference between power increase times and power decrease times in the historical data does not exceed an increase and decrease threshold, the user is determined to satisfy the intervention strategy of the cell, and the user is allowed to increase power; the process control unit 2 sets the increase and decrease threshold according to redundancy of power of the cell and a power demand condition of the user, and is also needed to take priority of the user into consideration; and if the redundancy of the power of the cell is low and the user has a strong demand on power increase, a strict restriction is set for a user with low priority under the condition of short power supply.

Or, the process control unit 2 is configured to, under the condition that a user has multiple links and the multiple links are not located in the same cell, when the multiple links all satisfy intervention strategies of cells where they are located, allow the user to increase power; the condition that the multiple links satisfy the intervention strategies of the cells where they are located refers to that: when the intervention strategies of the cells where the links are located adopt the normal mode, the links automatically satisfy the intervention strategies of the cells; and when the intervention strategies of the cells where the cells are located adopt the restricted mode, historical data of power increase and decrease of the links is read, and if each difference between power increase times and power decrease times in the historical data does not exceed an increase and decrease threshold, then the links are determined to satisfy the intervention strategies of the cells.

The process control unit 2 stores historical data of power increase and decrease after power control over the users is performed.

Embodiment 6

Figure 8:
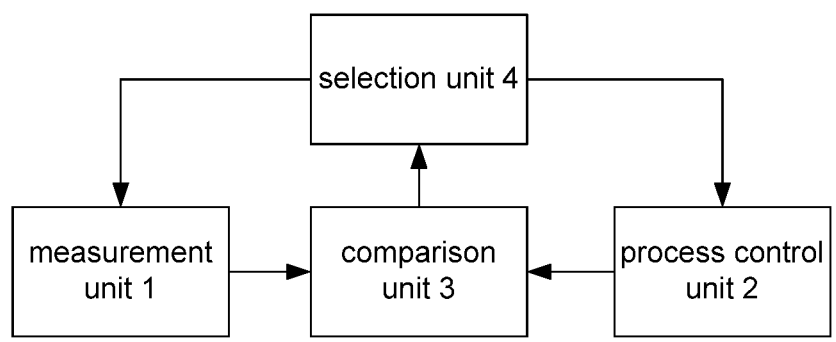
FIG. 8 is a structure diagram of a device for controlling uplink power according to embodiment 6 of the present disclosure.

The embodiment of the present disclosure implements a device for controlling uplink power, and as shown in FIG. 8, the device includes a measurement unit 1, a process control unit 2, a comparison unit 3 and a selection unit 4, wherein the measurement unit 1 makes statistics on transmit TP of each user in a cell, wherein, the measurement unit 1 estimates the transmit power of all users in the cell, adds transmit power values of all the users to obtain the transmit TP of all the users in the cell, obtains a comparison result according to a comparison between a transmit TP value and a received TP threshold value of the cell where the users are located, and sends the obtained comparison result to the selection unit 4;

the comparison unit 3 compares obtained SIRs of all the users with SIR_target, determines users satisfying SIR<SIR_target and users satisfying SIR≥SIR_target, determines values of TPCs according to a comparison result, and sends the comparison result between the SIRs of the users and SIR_target and sends the values of the TPCs to the selection unit 4; the values of the TPCs are marks of power increase;

the operation that the comparison unit 3 determines the values of the TPCs is implemented as follows: the values of the TPCs are determined according to a comparison between the obtained SIRs of all the users and the SIR_target set by a Node B, and the comparison unit 3 determines the values of the TPCs in a manner specified in a 3GPP specification TS25.214;

the selection unit 4 determines that the users satisfying SIR<SIR_target are needed to increase power while the users satisfying SIR≥SIR_target are needed to appropriately decrease power; when the SIRs of the users are greater than or equal to SIR_target, it is indicated that the users have high channel quality, and may appropriately decrease the power; and when the SIRs of the users are smaller than SIR_target, it is indicated that the users have poor channel quality, and are needed to increase power, and the transmit power value of each user is sent to the measurement unit 1.

The selection unit 4 determines whether to perform power control on each user according to an intervention strategy of the cell or not according to the obtained comparison result, and sends a selection message to the process control unit 2; and the selection unit 4 is configured to, when the comparison result indicates that the transmit TP value is smaller than the received TP threshold value and a difference between the transmit TP value and the received TP threshold value is greater than or equal to an abundance threshold, determine that power of the cell is abundant and select not to enable the intervention strategy for the users; while when the comparison result indicates that the transmit TP value is smaller than the received TP threshold value and the difference between the transmit TP value and the received TP threshold value is smaller than the abundance threshold, determine that the power of the cell is sufficient but not abundant and select to enable the intervention strategy of the cell for the users.

The selection unit 4 is further configured to, when the transmit TP value of all the users in the cell is greater than or equal to the received TP threshold value of the cell, start the intervention strategy of the cell for the users, and regulate the transmit power values of users with high priority according to priority levels.

The process control unit 2 sets the abundance threshold, wherein the abundance threshold is related to a communication environment of the cell; if the communication environment is poorer, then the abundance threshold is needed to be greater, because sufficient redundancy is needed to be reserved for the reason that the user may implement effective communication only after power is increased for many times; while if the communication environment is good, then a smaller abundance threshold may be reserved.

The process control unit 2 may allocate power to all the users according to need when the selection result is selecting not to start the intervention strategy of the cell, and allows a user satisfying the intervention strategy of the cell to increase power according to the intervention strategy of the cell when the selection result is selecting to start the intervention strategy of the cell.

The process control unit 2 is configured to set exception permissions for the users and mark whether the users have exception permissions or not, and is further configured to read permission marks of all the users, and if a user has a permission mark, determine that the user has an exception permission and directly perform power increase according to need of the user, and if a user has no permission mark, determine that the user has no exception permission and send a message to the measurement unit 1. For example, a permission mark of a user with an exception permission is 1, and a permission mark of a user without an exception permission is 0.

The measurement unit 1 may be a measurement receiver, the process control unit 2 may be a base station controller, the comparison unit 3 may be a comparator and the selection unit 4 may be a selector.

The process control unit 2 configures intervention strategies of cells, wherein the intervention strategies adopt a normal mode or a restricted mode;

the intervention strategies adopting the normal mode are that: when it is determined that a link of a user needs to increase power, the link is allowed to increase power;

the intervention strategies adopting the restricted mode are that: when it is determined that a link of a user needs to increase power, if a difference between power increase times and power decrease times in historical data of the link does not exceed an increase and decrease threshold, then the link is allowed to increase power, otherwise the link is forbidden to increase power; or when it is determined that the link of the user needs to increase power and a transmit TP value of all users in a cell is greater than a received TP threshold value of the cell, according to priority levels, users with high priority are allowed to increase power, and users with low priority are forced to decrease power.

The normal mode and restricted mode of the intervention strategies all correspond to values of cell modes. When a cell determines the type of an intervention strategy, a value of a cell mode corresponding to the type is stored in a RAM.

The process control unit 2 sets respective intervention strategies for cells, and each cell adopts the same intervention strategy for all links within its range.

The process control unit 2 determines the intervention strategy of each cell where each user is located.

Here, since a user may have multiple links, each link of the user is bound with a cell id of a cell where the each link is located, the cell where each link is located sends the cell id of the cell to the user, thus, a user with multiple links may have cell ids of multiple cells; since the cell id of each cell has a corresponding cell mode, intervention strategies of the cells are determined according to values of the cell modes, and intervention strategies which may be adopted for the users are finally determined; moreover, when link conditions of each user change, a link is needed to re-determine the cell id of the cell where the link is located, the intervention strategy of the cell is determined according to the value of the cell mode corresponding to the cell id, and the intervention strategies of the cells where the users are located after changing are re-determined. For example, if an intervention strategy of a cell adopts the normal mode, then a value of a corresponding cell mode is 0, and if the intervention of the cell adopts the restricted mode, then the value of the corresponding cell mode is 1;

for example, in a WCDMA system, user A has two links, and the two links of user A are a first link and a second link respectively, wherein a cell where the first link is located is a first cell, a cell where the second link is located is a second cell, the first cell and the second cell transmit their own cell ids to user A respectively, and then user A is bound with the cell id of the first cell and the cell id of the second cell respectively;

when a link condition of user A changes, the two links are changed into three links, a cell where a third link is located is a third cell, the third cell transmits a cell id to user A, and then user A is bound with the cell id of the first cell, the cell id of the second cell and the cell id of the third cell respectively;

when user A has two links, i.e. a first link and a second link respectively, a cell where the first link is a first cell, a cell where the second link is a third cell, a second cell and the third cell transmit their own cell ids to user A respectively during handover of the first link from the first cell to the second cell, and then user A is bound with the cell ids of the second cell and the third cell; and the process control unit 2 stores the cell ids bound with the user in the RAM.

The process control unit 2 allows the user satisfying the intervention strategy to increase power according to the intervention strategy of the cell, wherein, when the transmit TP value of all the users in the cell is smaller than the received TP threshold value and the difference between the transmit TP value and the received TP threshold value is smaller than the abundance threshold, under the condition that the user has a single link, the process control unit 2 allows the user to increase power when the intervention strategy of the cell adopts the normal mode and when it is determined that the user needs to increase power; when the intervention strategy of the cell adopts the restricted mode and it is determined that the user needs to increase power, historical data of power increase and decrease of the single link is read, and if a difference between power increase times and power decrease times in the historical data does not exceed an increase and decrease threshold, then the user is determined to satisfy the intervention strategy of the cell, and the user is allowed to increase power; the process control unit 2 sets the increase and decrease threshold according to redundancy of power of the cell and a power requirement condition of the user, and is also needed to take priority of the user into consideration; and if the redundancy of the power of the cell is low and the user has a strong demand on power increase, a strict restriction is set for a user with low priority under the condition of short power supply.

Or, under the condition that a user has multiple links and the multiple links are not located in the same cell, when the multiple links all satisfy intervention strategies of cells where they are located, the user is allowed to increase power; the condition that the links satisfy the intervention strategies of the cells where they are located refers to that: when the intervention strategies of the cells where the links are located adopt the normal mode and it is determined that the links need power increase, the links automatically satisfy the intervention strategies of the cells; and when the intervention strategies of the cells where the cells are located adopt the restricted mode and it is determined that the links need power increase, historical data of power increase and decrease of the links is read, and if each difference between power increase times and power decrease times in the historical data does not exceed an increase and decrease threshold, the links are determined to satisfy the intervention strategies of the cells.

The process control unit 2 stores historical data of power increase and decrease after power control over the users is performed. As shown in FIG. 6, when historical TPC values are stored in the RAM, a sliding window is adopted for storage of the historical TPC values, which stores only a historical TPC value corresponding to the latest slot with a total length n. The Node B stores the historical TPC value to a storage position, corresponding to the window, of the RAM after increasing and decreasing power of the user in a certain slot, the storage position being position 0, position 1 to position m, and the slot being slot0, slot1, slot2, slot3, slot4 to slot m−1 and slot m; and when historical TPC values are queried, historical TPC values stored at corresponding storage positions of the RAM within a window length range are read, then the read historical TPC values are accumulated and determined according to a principle that +1 indicates power increase and −1 indicates power decrease. If an accumulation result is power decrease or smaller than a power increase threshold restriction, then power is allowed to increase when a TPC value in a current slot indicates power increase is needed, otherwise power increase is restricted. After processing, the window slides forwards, a previously stored TPC value is deleted, and the TPC value in the current slot is stored for determination in the next slot.

The above are only the preferred embodiments of the present disclosure and not intended to limit the scope of protection of the present disclosure. Any modifications, equivalent replacements, improvements and the like made within the spirit and principle of the present disclosure shall fall within the scope of protection of the present disclosure.

What is claimed is:

1. A method for controlling uplink power, comprising:
   making, by a Node B, statistics on a transmit Total Power (TP) value of all users in a cell;
   comparing, by the Node B, the transmit TP value with a received TP threshold value of the cell;
   when it is determined that the transmit TP value is smaller than the received TP threshold value of the cell, comparing a difference between the transmit TP value and the received TP threshold value with an abundance threshold; and
   when the difference between the transmit TP value and the received TP threshold value is smaller than the abundance threshold, allowing a user satisfying an intervention strategy of the cell to increase power.

2. The method according to claim 1, further comprising:
   when it is determined that the transmit TP value is smaller than the received TP threshold value of the cell and the difference between the transmit TP value and the received TP threshold value is greater than or equal to the abundance threshold, allocating power to the users according to need.

3. The method according to claim 1, further comprising:
   before making, by the Node B, statistics on the transmit TP value of all the users in the cell,
   determining, by the Node B, whether a user in the cell needs to increase power or not according to a magnitude relationship between a Signal to Interference Ratio (SIR) and an SIR threshold value (SIR_TARGET) of the user in the cell;
   when SIR<SIR_TARGET, determining that the user needs to increase power; and
   when SIR≥SIR_TARGET, determining that the user does not need to increase power.

4. The method according to claim 3, wherein allowing the user satisfying the intervention strategy of the cell to increase power comprises:
   under a condition that the user has a single link, when the intervention strategy of the cell adopts a normal mode and it is determined that the user needs to increase power, allowing the user to increase power; and when the intervention strategy of the cell adopts a restricted mode and it is determined that the user needs to increase power, reading historical data of power increase and decrease of the single link, and if a difference between power increase times and power decrease times in the historical data does not exceed an increase and decrease threshold, determining that the user satisfies the intervention strategy of the cell and allowing the user to increase power;
   or, under a condition that the user has multiple links and the multiple links are located in different cells, when the multiple links satisfy intervention strategies of the cells where the multiple links are respectively located, allowing the user to increase power, wherein the condition that the multiple link satisfy the intervention strategies of the cells where the multiple links are respectively located refers to that: when the intervention strategies of the cells where the multiple links are respectively located adopt the normal mode and it is determined that the user needs to increase power, the multiple links automatically satisfy the intervention strategies of the cells; and when the intervention strategies of the cells where the multiple links are respectively located adopt the restricted mode and it is determined that the user needs to increase power, historical data of power increase and decrease of the multiple links is read, and if each difference between power increase times and power decrease times in the historical data does not exceed the increase and decrease threshold, the multiple links satisfy the intervention strategies of the cells.

5. The method according to claim 1, further comprising:
   before making, by the Node B, statistics on the transmit TP value of all the users in the cell,
   setting, by the Node B, exception permissions for the users, and marking whether the users have exception permissions or not; and
   reading, by the Node B, permission marks of the users, determining that the users have exception permissions according to the permission marks, and increasing power according to need of the users.

6. A device for controlling uplink power, comprising: a measurement unit, a process control unit, a comparison unit and a selection unit, wherein
   the measurement unit is configured to make statistics on a transmit Total Power (TP) value of all users in a cell, compare the transmit TP value with a received TP threshold value of the cell, and send a comparison result to the selection unit;
   the selection unit is configured to, when the comparison result indicates that the transmit TP value is smaller than the received TP threshold value of the cell and a difference between the transmit TP value and the received TP threshold value is smaller than an abundance threshold, select to start an intervention strategy of the cell, and send a selection result to the process control unit; and
   the process control unit is configured to, when the selection result is selecting to start the intervention strategy of the cell, allow a user satisfying the intervention strategy of the cell to increase power.

7. The device according to claim 6, wherein the selection unit is further configured to, when the comparison result indicates that the transmit TP value is smaller than the received TP threshold value of the cell and the difference between the transmit TP value and the received TP threshold value is greater than or equal to the abundance threshold, select not to start the intervention strategy of the cell, and send a selection result to the process control unit; and the process control unit is further configured to, when the selection result is selecting not to start the intervention strategy of the cell, allocate power to the users according to need.

8. The device according to claim 7, further comprising a comparison unit, configured to determine whether a user in the cell needs to increase power or not according to a magnitude relationship between a Signal to Interference Ratio (SIR) and an SIR threshold value (SIR_TARGET) of the user in the cell; and when SIR<SIR_TARGET, determine that the user needs to increase power, and when SIR≥SIR_TARGET, determine that the user does not need to increase power.

9. The device according to claim 6, further comprising a comparison unit, configured to determine whether a user in the cell needs to increase power or not according to a magnitude relationship between a Signal to Interference Ratio (SIR) and an SIR threshold value (SIR_TARGET) of the user in the cell; and when SIR<SIR_TARGET, determine that the user needs to increase power, and when SIR≥SIR_TARGET, determine that the user does not need to increase power.

10. The device according to claim 6, wherein the process control unit is configured to, under a condition that the user has a single link, when the intervention strategy of the cell adopts a normal mode and it is determined that the user needs to increase power, allow the user to increase power; and when the intervention strategy of the cell adopts a restricted mode and it is determined that the user needs to increase power, read historical data of power increase and decrease of the single link, and if a difference between power increase times and power decrease times in the historical data does not exceed an increase and decrease threshold, determine that the user satisfies the intervention strategy of the cell and allow the user to increase power;

or, the process control unit is configured to, under a condition that the user has multiple links and the multiple links are located in different cells, when the multiple links satisfy intervention strategies of the cells where the multiple links are respectively located, increase power of the user, wherein the condition that the multiple link satisfy the intervention strategies of the cells where the multiple links are respectively located refers to that: when the intervention strategies of the cells where the multiple links are located adopt the normal mode and it is determined that the user needs to increase power, the multiple links automatically satisfy the intervention strategies of the cells; and when the intervention strategies of the cells where the multiple links are respectively located adopt the restricted mode and it is determined that the user needs to increase power, historical data of power increase and decrease of the multiple links is read, and if each difference between power increase times and power decrease times in the historical data does not exceed the increase and decrease threshold, the multiple links satisfy the intervention strategies of the cells.

11. The device according to claim 6, wherein the process control unit is further configured to set exception permissions for the users, and mark whether the users have exception permissions or not, and is further configured to read permission marks of the users, determine that the users have exception permissions according to the permission marks, and increase power according to need of the users.

* * * * *